April 11, 1944.   S. G. ISSERSTEDT   2,346,307
CONTROL APPARATUS
Filed Nov. 24, 1941
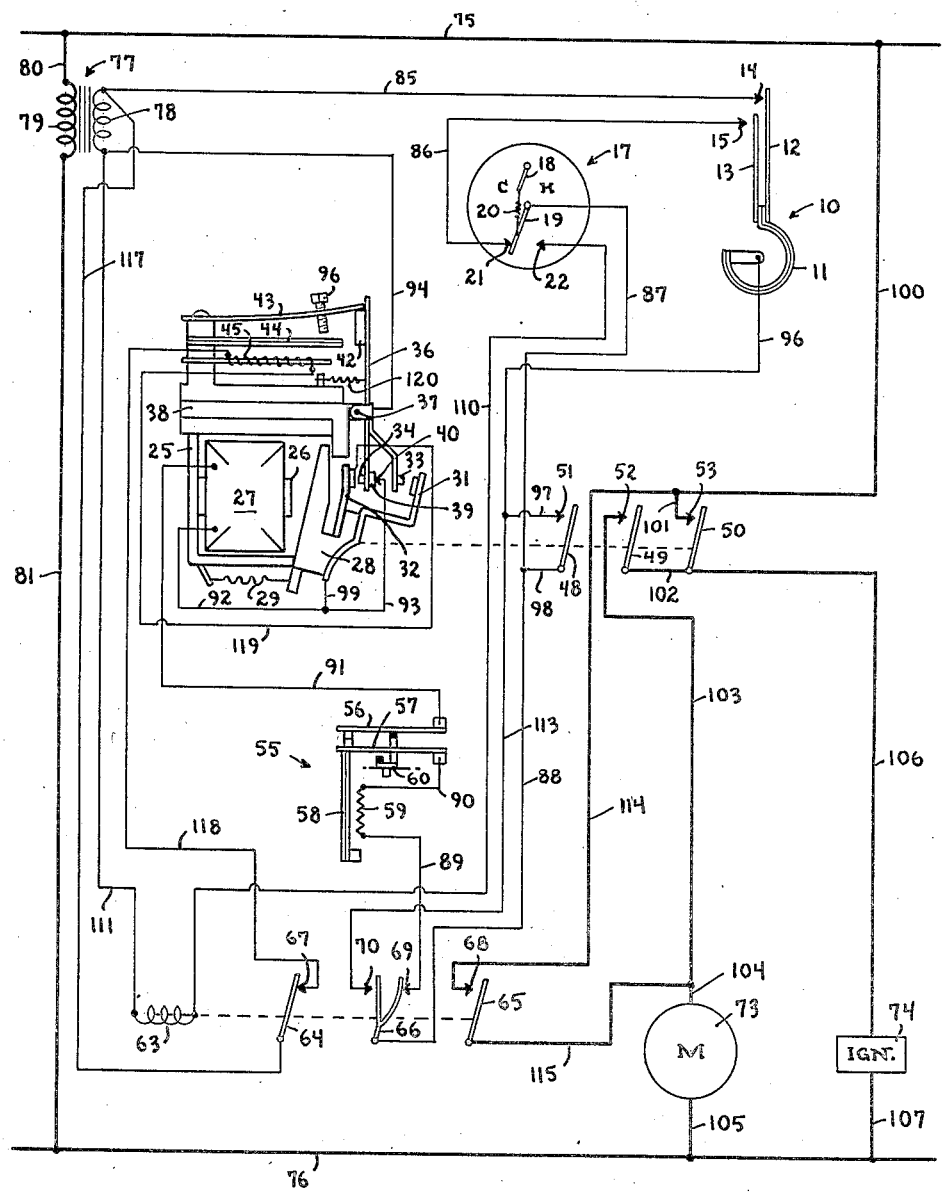
INVENTOR.
Siegfried G. Isserstedt
BY
George H. Fisher
Attorney Patented Apr. 11, 1944

2,346,307

UNITED STATES PATENT OFFICE 2,346,307

CONTROL APPARATUS

Siegfried G. Isserstedt, Minneapolis, Minn., assignor to Minneapolis-Honeywell Regulator Company, Minneapolis, Minn., a corporation of Delaware Application November 24, 1941, Serial No. 420,234

16 Claims. (Cl. 158—28)

The present invention is directed broadly to apparatus for a control system for a fluid fuel burner and is more particularly directed to such apparatus in which a timer is utilized for determining the minimum time during which the burner motor must be shut down before it can be reenergized, in order to provide for a proper scavenger period.

It is old in prior art systems to utilize a timer, such as a bimetallic element having a heater, for timing the recycle of a burner motor in a fuel burner controlling system. However, in a great many of these systems the timer is heated when the burner motor is energized and remains heated during the entire time that the system is in operation. The time required for the burner motor to recycle is then timed by the bimetallic timer as it cools down to a predetermined temperature. It has been found that in such systems the time necessary for the burner motor to recycle depends to a large extent upon the time that the system is in operation, because the longer the system operates the more heat there is put into the bimetal and therefore the longer will be the time required for the bimetal to cool off and return to its cold position.

It is a prime object of the present invention to provide apparatus for a system having a timer which is normally deenergized when the burner motor is in operation, and which is energized when the burner motor is shut down, said timer when energized operating to move to an energized position, the time required for the timer to move to its energized position determining the time required for the burner motor to recycle. Therefore where a bimetal or other type of thermal timer with a heating element is used, the time of recycle will remain constant because the timer will remain cold during such time as the system is in operation. The time of recycle will therefore be determined by the time required for the thermal timer to heat up to a predetermined value. In this way the heat may be put into the timer faster and the timing period more accurately determined.

A further object of the invention is to provide apparatus for a system of the above type which includes a starting switch which is latched in open position when the system is put into operation on a call for heat, and also to provide a timer which is energized when the system is shut down for tripping the latch after a predetermined period of time permitting reclosure of the starting switch.

A further object of the invention is to operate a relay operating in conjunction with the latch in such a manner that a holding circuit is established around said starting switch upon energization of said relay, said relay thereafter operating to latch said starting switch in open circuit position.

A still further object is to energize a second relay in response to the establishment of combustion to set up a maintaining circuit for the burner motor which was originally energized by the first relay, at the same time deenergizing the first relay, and to provide a switch means operated by the second relay when it is deenergized for causing energization of a timer for tripping the latch and permitting reclosure of the starting switch a predetermined period after the second relay has dropped out.

This invention further contemplates the inclusion of an ignition device for igniting the fuel in the burner, and energizing the ignition device and burner motor simultaneously by means of the first relay, energization of the second relay maintaining operation of the burner motor while dropping out the first relay which acts to deenergize the ignition device.

The invention also contemplates the inclusion of the usual thermally actuated safety switch for maintaining at all times a supervisory control over the system, the heater for the safety switch being located in the circuit to the first relay, which circuit is opened when the second relay pulls in in response to the establishment of combustion.

These and other objects will readily become apparent to those who are skilled in the art as the following specification is read in the light of the accompanying drawing which comprises a single figure illustrating diagrammatically a fuel burner control system embodying my invention.

Referring now to the drawing, the reference numeral 10 indicates generally a switching means comprising a bimetallic thermostat 11 which may be located in the space whose temperature is to be controlled by the burner. The bimetallic element 11 is fixed at one end and carries at its free end a first resilient contact blade 12 and a second contact blade 13. These blades are so arranged that on a decrease in temperature the contact blade 12 will first engage the stationary contact 14 and on a further decrease in temperature the contact blade 13 will engage a stationary contact 15.

Indicated generally at 17 is a combustion responsive switching mechanism shown as comprising a movable arm 18, which operates a switch arm 19 with a snap action through the medium of an over-center spring 20. As will be seen later, the circuit in which this switching mechanism is used does not require that the control of these switches overlap in either direction. The mechanism for operating the arm 18 may be any one of a number of known mechanisms which are adapted to respond to the presence or absence of combustion at the burner. In other words, the arm 18 is not intended to be calibrated, but is adapted to respond to a change in temperature caused by the appearance or disappearance of a flame in the combustion chamber. In the absence of a flame in the combustion chamber, the arm 18 assumes the position shown in the drawing, at which time the contact arm 19 will be in engagement with the stationary contact 21. Upon the appearance of a flame, the arm 18 will be moved in a counterclockwise direction causing the contact arm 19 to snap into engagement with the stationary contact 22. Thus the arm 19 will engage the contact 22 when there is a flame present in the combustion chamber, and will engage the contact 21 in the absence of such a flame.

The reference numeral 25 indicates a relay bracket supporting a core 26 and a relay coil 27. The bracket 25 pivotally carries an armature 28. A spring 29 moves the armature 28 to its out position when the relay coil 27 is deenergized, and the coil, when energized, attracts the armature 28 and moves it to its in position. The armature 28 carries a pair of contact arms 31 and 32 which are adapted to cooperate with the contacts 33 and 34, respectively. These contacts are carried by a latch or lever 36 which is pivotally mounted at 37 to a bracket 38 carried by the bracket 25. The lever 36 additionally carries a contact 39 which is adapted to cooperate with a stationary contact 40.

The end of the lever 36 which is opposite the contacts 33, 34 and 39 is provided with a projection 42 which is adapted to be latched, under certain conditions to be described later, on the free end of a resilient blade 43 which is fixed at its opposite end. The blade 43 is adapted to cooperate with a bimetallic blade 44 which is mounted at one end to a fixed support and is free to flex at its opposite end. An electric heater 45 is mounted adjacent the blade 44 so that when the heater is energized it heats the blade to cause its free end to move in an upwardly direction, as seen in the drawing.

The operation of the relay, latch and timer is as follows: the parts are shown in the drawing in the positions which they will occupy when the relay coil 27 is deenergized, the armature 28 in its out position, the latch 36 in its tripped position, and the bimetallic blade 44 cold. When the relay coil 27 is energized, the armature 28 will be pulled in and the contact arm 31 will first engage the contact 33 on the latch 36 causing the latch to rotate in a clockwise direction and permit the free end of the flexible blade 43 to move downwardly opposite the projection 42 carried by the latch 36. The position of the blade 43 at this time will be determined by the engagement of the end of the adjustable screw 96 with the bimetallic blade 44. Rotation of the latch 36 will cause the contact 39 to disengage the stationary contact 40. Contact 34 will not engage the contact arm 32 because contact 32 moves in with the armature 28 and therefore keeps out of the way of the contact 34. When the relay coil 27 is deenergized, the armature 28 will drop out causing the contact arm 31 to separate from the contact 33. The latch 36 cannot rotate back to its original position because the projection 42 is abutting the free end of the resilient blade 43, and this prevents the contact 39 from reengaging the stationary contact 40. As the armature 28 drops out however, the contact arm 32 can now engage the contact 34. It should therefore be clear that when the relay is deenergized and the latch is tripped, as shown in the drawing, switch 39, 40 is closed and the other two are open. When the relay coil is energized, switch 31, 33 is closed and the other two are open. When the relay is deenergized and the latch is in its latched position, the switch 32, 34 is closed and the other two are open. There is therefore only one of the three switches closed during any stable position of the operating parts.

The relay armature 28 actually carries three additional contact arms indicated at 48, 49 and 50. For the sake of clarity, these arms have been indicated diagrammatically to the right of the relay but it will be appreciated that in the actual construction of the device these three arms are also preferably carried directly by the armature 28. When the armature 28 is in its attracted position, the arms 48, 49 and 50 are engaging their stationary contacts 51, 52 and 53, respectively, and when the armature 28 is in its out position these arms are separated from their contacts as shown in the drawing.

This system is provided with the usual thermally actuated safety switch indicated generally at 55 and shown as comprising a pair of resilient contact blades 56 and 57 which are biased to open circuit position but which are held in closed position by the free end of a bimetallic blade 58. This blade 58 is shown as being heated by means of an electric heater 59 which, if allowed to remain energized for a sufficient period of time, causes the free end of the blade 58 to warp to the left from beneath the contact blade 57, thereby permitting it to move to open circuit position. The blade 57 cannot be returned automatically to open circuit position when the blade 58 cools, but must be manually reset by means of the trip free reset button indicated at 60.

The system is provided with a second relay which is shown diagrammatically as comprising a relay coil 63 for actuating the contact arms 64 and 65 and the bifurcated contact arm 66. The contact arm 64 is adapted to engage its stationary contact 67 when the relay coil 63 is deenergized, and the contact arm 65 is adapted to engage its stationary contact 68 when the relay coil 63 is energized. The bifurcated contact arm 66 is adapted to cooperate with an "out" contact 69 and an "in" contact 70, and the bifurcations of this arm are made resilient so that as the relay coil 63 is energized the arm 66 will first engage contact 70 and then disengage contact 69, and when the relay coil 63 is deenergized the contact arm 66 will first engage contact 69 and then disengage contact 70.

This system is also provided with an electrical device for delivering fuel to a burner. In this case it is indicated diagrammatically at 73 and may take the form of the usual oil burner motor. An ignition device 74 is provided for igniting the fuel delivered to the burner by the burner motor 73.

The system as a whole, is supplied with electrical energy from the two line wires 75 and 76. The low voltage portion of the system is fed from the secondary winding 78 of a step down transformer 77, the primary winding of which is connected across the line wires 75 and 76 by means of conductors 80 and 81.

*Operation*

The various elements of the system are shown in the drawing in the position which they will occupy when the room temperature to which the thermostat 10 responds is above the setting of the thermostat. Therefore the two contact blades 12 and 13 will be out of engagement with their respective contacts. The circuit to the relay coil 27 is therefore open and the armature 28 is in its out position. The system has been shut down sufficiently long for the combustion responsive device to move the contact 19 out of engagement with the hot contact 22 and into engagement with the cold contact 21. The circuit to the relay coil 63 is also open and this relay will be in its out position. The system has also been deenergized for a sufficient period of time for the bimetallic element 44 to move the blade 43 far enough to trip the latch 36 and therefore the starting switch 39, 40 is closed. The bimetallic blade 44 has returned to its cold position. Under these conditions, the burner motor 73 and ignition device 74 are deenergized and there is no current flowing anywhere in the system.

As a result of the deenergization of the burner motor 73 and the ignition device 74, the temperature in the room being heated will start to decrease with the result that the bimetallic element 11 of the room thermostat 10 will begin to contract and will first cause the switch blade 12 to engage its stationary contact 14. This will not result in the closure of a circuit at the present time due to the fact that the relay arm 48 is out of engagement with the stationary contact 51 and relay arm 66 is out of engagement with the stationary contact 70. Therefore the room temperature will continue to drop until the bimetallic element 11 causes the switch blade 13 to engage stationary contact 15. This will result in the closing of an energizing circuit for the relay winding 27 from one side of the secondary 78 through conductor 85, contact 14, switch blades 12 and 13, contact 15, conductor 86, cold contact 21 of the combustion responsive switch 17, contact blade 19, conductors 87 and 88, switch arm 66, contact 69, conductor 89, electric heater 59, conductor 90, safety switch blades 57 and 56, conductor 91, relay coil 27, conductors 92 and 93, starting switch 40, 39, latch 36, and conductor 94 back to the other side of the secondary winding 78. Closure of this circuit causes the relay coil 27 to pull in the armature 28, which first causes the engagement of the contact arm 31 with the contact 33 which is carried by the latch 36. As the arm 31 continues to move in, it imparts a clockwise rotation to the latch 36 by reason of its engagement with the contact 33, thereby causing the latch 36 to move the contact 39 out of engagement with contact 40 and also cause the latch 36 to release the free end of the resilient blade 43 which moves downwardly as seen in the drawing until the end of the adjustable screw 96 engages the free end of the bimetallic blade 44. At this time the free end of the blade 43 will be opposite the projection 42 carried by the latch 36, and is therefore operative to prevent the reclosure of the contacts 39 and 40. It will be noted that the contacts 32 and 34 will not be brought into engagement at this time due to the fact that they both move in the same direction as the armature 28 is pulled in by the relay 27. At this time therefore, the switch 31, 33 will be closed while the switch 39, 40 and switch 32, 34 will be open. Also as the relay armature 28 is pulled in, the relay arms 48, 49 and 50 will be caused to engage their stationary contacts 51, 52 and 53, respectively.

Closure of the switch 31, 33 establishes a holding circuit for the relay coil 27 which is independent of the starting switch 39, 40. Also the closure of the relay arm 48 with the stationary contact 51 closes a holding circuit for the relay 27 which is independent of the switch 13, 15 of the thermostat 10, and is also independent of the cold switch 19, 21 of the combustion device 17. This entire holding circuit may be traced as follows: from one end of the secondary winding 78 through conductor 85, contact 14, switch blade 12, bimetallic element 11, conductors 96 and 97, contact 51, relay arm 48, conductors 98 and 88, relay arm 66, contact 69, conductor 89, electric heater 59, conductor 90, safety switch blades 57 and 56, conductor 91, relay coil 27, conductors 92 and 99, relay arm 31, contact 33, latch 36, and conductor 94 back to the other side of the secondary 78. At this time therefore, a slight vibration of the thermostat causing chattering of the switch blade 13 on the contact 15, or a movement of the combustion responsive contact arm 19 away from its cold contact 21 in response to the establishment of combustion will not affect the energization of the relay coil 27.

It should also be noted that upon the energization of the relay coil 27 the relay arms 49 and 50 will be brought into engagement with the stationary contacts 52 and 53 which will establish an energizing circuit to the burner motor 73, from line wire 75 through conductors 100 and 101, contact 53, relay arm 50, conductor 102, relay arm 49, contact 52, conductors 103 and 104, burner motor 73, and conductor 105 to the other line wire 76.

The ignition device 74 is simultaneously energized by a circuit extending from the line wire 75 through conductors 100 and 101, contact 53, relay arm 50, conductor 106, ignition device 74, and conductor 107 back to the other line wire 76. It will therefore be seen that on an original call for heat by the room thermostat a starting circuit for the relay coil 27 is established through a cold combustion switch and through a starting switch controlled by the latch 36. It will also be seen that when the relay coil 27 is energized it sets up a holding circuit for itself which is independent of the starting switch and also independent of the cold combustion switch, and that the latch is operated to its latched position in which it mechanically prevents the reclosing of the starting switch. The relay coil 27 at the same time energizes the burner motor and the ignition device. It will be noted further that the electric heater 59 for the thermal safety switch 55 is located in both the starting circuit and the holding circuit to the relay coil 27. Therefore, if these circuits remain energized for a predetermined period of time, the thermal device 58 will warp toward the left and release the resilient blade 57 which will move downwardly to open circuit position. This will result in the deenergization of the relay coil 27, at which time the armature 28 will drop out and cause deenergization of the burner motor 73 and the ignition device 74. The safety switch 55 will not automatically return to closed position but will have to be manually reset before the relay coil 27 can again be energized.

Assume now that the room thermostat 10 has called for heat and has energized relay coil 27 which has in turn set up its holding circuit and has just energized the burner motor 73 and the ignition device 74 as set forth in detail above. Normally, this will result in the establishment of combustion at the burner with the result that the combustion responsive device 17 will cause the contact arm 19 to snap toward the right, out of engagement with cold contact 21 and into engagement with its hot contact 22. This will result in the energization of the relay coil 63 through the following circuit: from one side of the secondary winding 78 through conductor 85, contact 14, switch blade 12, bimetallic element 11, conductor 96, conductor 97, contact 51, relay arm 48, conductor 98, conductor 87, switch blade 19, contact 22, conductor 110, relay coil 63, and conductor 111 back to the other side of the secondary winding 78. Energization of the relay coil 63 will cause the relay arms 64, 66 and 65 to swing toward the left. Movement of the relay arm 64 out of engagement with contact 67 will have no effect at this time upon the system due to the fact that there was no circuit passing through these elements. It will be remembered that the holding circuit for relay coil 27 passed through the relay arm 66 and the stationary contact 69. As the relay arm 66 moves toward the left, it first moves into engagement with the stationary contact 70 before it separates from the contact 69. This establishes a holding circuit for the relay coil 63 which is independent of the contact arm 48 and contact 51 controlled by relay coil 27. This circuit may be traced from one side of the secondary winding 78 through conductor 85, contact 14, switch blade 12, bimetallic element 11, conductors 96 and 113, contact 70, relay arm 66, conductors 88 and 87, contact arm 19, hot contact 22, conductor 110, relay coil 63, and conductor 111 back to the other side of the secondary winding 78. As the relay arm 66 continues to move to the left, it separates from stationary contact 69 thereby breaking the circuit to the relay coil 27. This relay coil is thereby deenergized and the armature 28 drops out causing separation of the relay arms 48, 49 and 50 from their stationary contacts 51, 52, and 53, respectively. Separation of the relay arm 50 from its stationary contact 53 results in the deenergization of the ignition device 74, but the burner motor 73 remains energized through a circuit extending from line wire 75 through conductors 100 and 114, contact 68, relay arm 65, conductors 115 and 104, burner motor 73, and conductor 105 back to the other line wire 76. It will be understood that the relay arm 65 engages its stationary contact 68 before the relay coil 27 is deenergized, and therefore before the relay arms 49 and 50 separate from their contacts 52 and 53. The burner motor 73 therefore remains energized without any interruption.

At this time, therefore, the relay coil 27 is deenergized, the electric heater 59 for the thermal switch 55 is deenergized, the ignition switch 74 is deenergized, and the burner motor 73 is maintained in operation through the switch 65, 68 which is maintained in closed position by the relay coil 63 which is in turn energized by means of a circuit passing serially through the hot combustion switch 13, 22, and the room temperature responsive switch 12, 14. It might be explained also that the latch 36 is at this time latched on the end of the resilient blade 43, which action prevents the closure of the starting switch 39, 40. The relay armature 28 is also in its out position and therefore the contact arm 32 is in engagement with the latch contact 34. Therefore at this time the switch 32, 34 is closed and the switches 39, 40 and 33, 31 are open. This is the running condition of the system.

The circuit to the relay coil 63 may now be broken by either of two conditions: a flame failure at the burner which will cause the combustion responsive switch blade 19 to separate from its hot contact 22 and move into engagement with its cold contact 21, or an increase in temperature in the room which will cause the bimetallic element 11 to move the switch blade 12 out of engagement with its stationary contact 14. In either case, the relay coil 63 will be deenergized and cause the relay arm 65 to separate from contact 68, thus causing deenergization of the burner motor 73. Also the relay arm 66 will disengage the contact 70 and move back into engagement with contact 69. The starting switch 39, 40 is open so the relay coil 27 will not be energized at this time even though room thermostat switch blades 12 and 13 are in engagement with their stationary contacts 14 and 15. At the same time the relay arm 64 will engage the "out" contact 67. This last action will complete a circuit from one side of the secondary winding 78 through conductor 117, relay arm 64, "out" contact 67, conductor 118, electric heater 45 for the bimetallic element 44, conductor 119, contact arm 32, contact 34, latch 36, and conductor 94 back to the other side of the secondary winding 78. Energization of the electric heater 45 will cause the bimetallic timer blade 44 to heat up and after a predetermined period of time it will, through the adjustable screw 96, cause the free end of the blade 43 to move from opposite the projection 42 carried by the latch 36, at which time the latch will rotate in a counter-clockwise direction to cause the contact 34 to move out of engagement with the contact arm 32 and cause the contact 39 to move into engagement with the contact 40. In other words, the circuit to the heater 45 will now be broken and the starting switch 39, 40 will now be reclosed. The latch 36 may be so mounted that the last described action when the latch is tripped may be produced by gravity, or if desired a small biasing spring 120 may be provided.

It will be seen that once the burner motor 73 has been deenergized by the energization of the relay coil 63, that it cannot be reenergized until the starting switch 39, 40 has been reclosed. It will also be seen that this starting switch is reclosed through the action of the thermal timer 44 which starts heating only after the relay coil 63 has been deenergized to close its "out" switch 64, 67. Therefore, the thermal timer 44 and its electric heater 45 through the cooperation of the latch 36 and resilient blade 43 time the period required for the system to recycle. It is obvious that this time may be adjusted merely by screwing the adjustable screw 96 in or out of the resilient blade 43 to thereby vary the total distance which the free end of the bimetallic blade 44 must move in order to trip the latch 36.

In the event that the system was in running condition and a momentary power failure occurred, the relay coil 63 would be deenergized and its armature would drop out causing relay arm 65 to separate from its contact 68 thereby preventing reenergization of the burner motor when the power came back on. At the same time the relay arm 64 would engage contact 67 so that when the power was resumed the electric heater 45 would be energized and the bimetal timer would trip the latch 36 and reclose the starting switch 39, 40. If the room thermostat were still calling for heat, the system would then start up normally.

It will be obvious to those skilled in the art that this apparatus may be applied to other types of burners than oil burners and that further changes and modifications in this system may be made without departing from the scope of my invention. I therefore wish it to be understood that I intend to be limited only by the appended claims rather than by the specific embodiment which I have disclosed herein.

I claim as my invention:

1. A fluid fuel burner control system comprising in combination, means which, when energized, delivers fuel to a fuel burner, main switch means, a starting switch, a combustion responsive device, a cold switch closed thereby in the absence of combustion at the burner and a hot switch closed thereby in the presence of combustion at the burner, a starting circuit including said main switch means, starting switch, and cold switch, said fuel delivery means being energized as a result of the closure of said circuit, means for opening said starting switch following the closure of said circuit, means controlled by said main switch means for maintaining energization of said fuel delivery means independently of said starting switch, said hot switch cooperating with said maintaining means upon establishment of combustion so that either said main switch means or hot switch may open to cause said maintaining means to deenergize said fuel delivery means, timer means preventing the reclosure of said starting switch, and means energizing said timer means upon deenergization of said fuel delivery means for reclosing said starting switch after a predetermined period of time.

2. A fluid fuel burner control device comprising in combination, a relay having armature means, a latch, a starting switch which is closed by said latch when it is in its tripped position and open when it is in its latched position, a timer, connections to said relay including said starting switch adapted when completed to form an energizing circuit for said relay dependent upon the closure of said starting switch, switch means adapted to be so connected to electrical means for controlling the delivery of fuel to a fuel burner that when said switch means is closed said electrical means assumes a condition in which fuel can flow to said burner, said armature means acting, when said relay is energized, to latch said latch and close said switch means, a third switch closed by said armature means upon opening of said relay circuit, and means including said third switch for controlling the energization of said timer, said timer when energized moving in a direction to trip said latch.

3. A fluid fuel burner control system comprising in combination, electrical means for delivering fuel to a fuel burner, a relay having armature means, a latch, a starting switch which is closed by said latch when it is in its tripped position and open when it is in its latched position, a timer, an energizing circuit for said relay including said starting switch, means for closing said circuit, switch means, a holding switch, said armature means acting, when said relay is energized, to latch said latch and close said switch means and holding switch, closure of said switch means causing energization of said electrical fuel delivery means, closure of said holding switch establishing a holding circuit for said relay independent of said starting switch, a third switch, said relay, upon deenergization, opening said holding switch and closing said third switch, means controlled by said third switch for energizing said timer, said timer thereupon moving in a direction to trip said latch, and means deenergizing said timer after said latch has been tripped, said timer thereupon tending to return to its original position.

4. A fluid fuel burner control system comprising in combination, electrical means for delivering fuel to a fuel burner, a relay having armature means, a latch, a starting switch which is closed by said latch when it is in its tripped position and open when it is in its latched position, a timer, an energizing circuit for said relay including said starting switch, means for closing said circuit, switch means, a holding switch comprising a first contact carried by said armature means and a second contact carried by said latch, said armature means acting, when said relay is energized, to bring said first contact into engagement with said second contact and move said latch to latched position through the engagement of said contacts whereby said holding switch is always made before said starting switch is opened, said armature acting also to close said switch means and energize said electrical fuel delivery means, closure of said holding switch establishing a holding circuit for said relay independent of said starting switch, a third switch, said relay, upon deenergization, opening said holding switch and closing said third switch, means controlled by said third switch for energizing said timer, said timer thereupon moving in a direction to trip said latch, and means deenergizing said timer after said latch has been tripped, said timer thereupon tending to return to its original position.

5. A fluid fuel burner control system comprising in combination, electrical means for delivering fuel to a fuel burner, a relay having armature means, a latch, a starting switch which is closed by said latch when it is in its tripped position and open when it is in its latched position, a timer, an energizing circuit for said relay including said starting switch, means for closing said circuit, switch means, a holding switch, said armature means acting, when said relay is energized, to latch said latch and close said switch means and holding switch, closure of said switch means causing energization of said electrical fuel delivery means, closure of said holding switch establishing a holding circuit for said relay independent of said starting switch, a third switch comprising a first contact on said armature means and a second contact on said latch, said contacts moving in the same direction and therefore remaining separated as said relay is energized and said armature means latches said latch, said first contact of the third switch moving into engagement with said second contact when said relay is deenergized and said latch is in latched position, said armature means also opening said holding switch and switch means at this time, means controlled by said third switch for energizing said timer, said timer thereupon moving in a direction to trip said latch, said latch, when tripped, moving the second contact of said third switch out of engagement with said first contact, whereupon said timer is deenergized and tends to return to its original position.

6. A fluid fuel burner control system comprising in combination, electrical means for delivering fuel to a fuel burner, a relay having armature means, a latch, a starting switch which is closed by said latch when it is in its tripped position and open when it is in its latched position, a timer, an energizing circuit for said relay including said starting switch, means for closing said circuit, switch means, a holding switch comprising a first contact carried by said armature means and a second contact carried by said latch, said armature means acting, when said relay is energized, to bring said first contact into engagement with said second contact and move said latch to latched position through the engagement of said contacts whereby said holding switch is always made before said starting switch is opened, said armature acting also to close said switch means and energize said electrical fuel delivery means, closure of said holding switch establishing a holding circuit for said relay independent of said starting switch, a third switch comprising a first contact on said armature means and a second contact on said latch, said contacts moving in the same direction and therefore remaining separated as said relay is energized and said armature means latches said latch, said first contact of the third switch moving into engagement with said second contact when said relay is deenergized and said latch is in latched position, said armature means also opening said holding switch and switch means at this time, means controlled by said third switch for energizing said timer, said timer thereupon moving in a direction to trip said latch, said latch, when tripped, moving the second contact of said third switch out of engagement with said first contact, whereupon said timer is deenergized and tends to return to its original position.

7. A fluid fuel burner control system comprising in combination, electrical means for delivering fuel to a burner, a starting circuit, a starting switch in said circuit, a latch having latched and unlatched positions, said latch closing said starting switch in one of its positions and opening said starting switch in the other of its positions, means responsive to the closure of said starting circuit for energizing said electrical fuel feeding means and moving said latch to said other of its positions, said last mentioned means also closing a holding circuit for itself, means operating in response to the establishment of combustion for closing a third circuit and opening said holding circuit, said third circuit maintaining energization of said electrical fuel delivery means, a timer, and means operating in response to the opening of said third circuit for deenergizing said electrical fuel delivery means and energizing said timer, said timer operating to return said latch to its said one position after a predetermined period of time.

8. A fluid fuel burner control system comprising in combination, electrical means for delivering fuel to a burner, a normally closed starting switch, a first relay, a normally closed thermally actuated safety switch, a heater therefor, a first circuit including said starting switch, relay, and heater, a holding switch connected in shunt with said starting switch, said relay, when energized by the above circuit, first closing said holding switch and then opening said starting switch, a timer for locking said starting switch in open position once it has been opened by said relay, said electrical fuel delivery means being energized as a result of the closure of said first circuit, said heater being adapted to cause opening of said safety switch to deenergize said electrical fuel delivery means after a predetermined period of time, a second relay, means responsive to the establishment of combustion for energizing said second relay, said second relay opening said first circuit thereby deenergizing said first relay and safety switch heater while maintaining energization of said electrical fuel delivery means, and switch means operated by said second relay upon a subsequent deenergization thereof for energizing said timer, said timer reclosing said starting switch and deenergizing itself after a predetermined period of time.

9. A fluid fuel burner control system comprising in combination, electrical means for delivering fuel to a burner, a normally closed starting switch, a first relay, a normally closed thermally actuated safety switch, a heater therefor, a first circuit including said starting switch, relay, and heater, a holding switch connected in shunt with said starting switch, said relay, when energized by the above circuit, first closing said holding switch and then opening said starting switch, a timer for locking said starting switch in open position once it has been opened by said relay, an ignition device, switch means closed by said first relay for energizing said electrical fuel delivery means and said ignition device for igniting fuel at said burner, said heater being adapted to cause opening of said safety switch to deenergize said electrical fuel delivery means after a predetermined period of time, a second relay, means responsive to the establishment of combustion for energizing said second relay, said second relay opening said first circuit thereby deenergizing said first relay and safety switch heater, second switch means closed by said second relay for maintaining energization of said electrical fuel delivery means, said ignition device being deenergized upon deenergization of said first relay, and third switch means operated by said second relay upon a subsequent deenergization thereof for energizing said timer, said timer reclosing said starting switch and deenergizing itself after a predetermined period of time.

10. A fluid fuel burner control system comprising in combination, electrical means for delivering fuel to a burner, a latch, a starting switch closed by said latch when it is in its tripped position and open when it is in its latched position, main switching means, a first relay, a first circuit including said main switching means, relay, and starting switch, a normally open holding switch in shunt with said starting switch, second switching means, said relay, when energized, first closing said holding switch and then latching said latch to open said starting switch, said relay also closing said second switching means to energize said electrical fuel feeding means, a second relay, means responsive to combustion at the burner for closing a second circuit including said main switching means and said second relay, said second relay, when energized, first establishing a maintaining circuit for said electrical fuel feeding means and then opening the circuit to said first relay, a timer, and means actuated by said second relay upon opening of said second circuit either by said combustion responsive means or said main switching means for energizing said timer, said timer, when energized, moving in a direction to trip said latch thereby reclosing said starting switch.

11. A fluid fuel burner control system comprising in combination, electrical means for delivering fuel to a burner, a latch, a starting switch closed by said latch when it is in its tripped position and open when it is in its latched position, main switching means, a first relay, a first circuit including said main switching means, relay, and starting switch, a normally open holding switch in shunt with said starting switch, second switching means, an ignition device, said relay, when energized, first closing said holding switch and then latching said latch to open said starting switch, said relay also closing said second switching means to energize said electrical fuel feeding means and ignition device, a second relay, means responsive to combustion at the burner for closing a second circuit including said main switching means and said second relay, said second relay, when energized, first establishing a maintaining circuit for said electrical fuel feeding means and then opening the circuit to said first relay, deenergization of said first relay opening said second switching means thereby deenergizing said ignition device, a timer, and means actuated by said second relay upon opening of said second circuit either by said combustion responsive means or said main switching means for energizing said timer, said timer, when energized, moving in a direction to trip said latch thereby reclosing said starting switch.

12. A fluid fuel burner control system comprising in combination, electrical means for delivering fuel to a burner, a latch, a starting switch closed by said latch when it is in its tripped position and open when it is in its latched position, main switching means, a combustion responsive device having hot and cold switches, a first relay, a first circuit including said main switching means, relay, cold switch, and starting switch, a normally open holding switch in shunt with said starting switch, a second holding switch, second switching means, said relay, when energized, first closing said holding switches and then latching said latch to open said starting switch, a holding circuit for said relay established by said holding switches independent of said starting switch and cold switch, said relay also closing said second switching means to energize said electrical fuel feeding means, a second relay, a second circuit including said main switching means, hot switch, and said second relay, said second relay, when energized, first establishing a maintaining circuit for said electrical fuel feeding means and then opening the holding circuit to said first relay, a timer, and means actuated by said second relay upon opening of said second circuit either by said combustion responsive means or said main switching means for energizing said timer, said timer, when energized, moving in a direction to trip said latch thereby reclosing said starting switch.

13. A fluid fuel burner control system comprising in combination, electrical means for delivering fuel to a burner, a biased open, latched closed safety switch in control of said electrical fuel delivery means, a latch, a starting switch closed by said latch when it is in its tripped position and open when it is in its latched position, main switching means, a first relay, electrical tripping means for said safety switch, a first circuit including said main switching means, relay, electrical tripping means, and starting switch, a normally open holding switch in shunt with said starting switch, second switching means, said relay, when energized, first closing said holding switch and then latching said latch to open said starting switch, said relay also closing said second switching means to energize said electrical fuel feeding means, a second relay, means responsive to combustion at the burner for closing a second circuit including said main switching means and said second relay, said second relay, when energized, first establishing a maintaining circuit for said electrical fuel feeding means and then opening the circuit to said first relay, a timer, and means actuated by said second relay upon opening of said second circuit either by said combustion responsive means or said main switching means for energizing said timer, said timer, when energized, moving in a direction to trip said latch thereby reclosing said starting switch.

14. In a fluid fuel burner control device, a burner controlling device adapted to be so connected to a fuel controlling means that when it is energized fuel is supplied to a burner, a relay adapted to be connected to said control device in such a manner that said relay is effective when energized to initiate energization of said burner controlling device, connections including a starting switch and adapted to include a main switch for controlling the energization of said relay, said relay including means effective when said relay is energized to maintain said relay energized independently of said starting switch and to move said starting switch to open position, said starting switch remaining in said open position when so moved, timing means effective when energized to cause said starting switch to reclose, and means operative upon deenergization of said burner control device following the energization thereof to cause energization of said timing means.

15. In a fluid fuel burner control system, a fuel controlling means operative when energized to cause fuel to be supplied to a burner, a relay effective when energized to initiate energization of said fuel controlling means, a main switch and a starting switch controlling the energization of said relay, said relay including means effective when said relay is energized to maintain said relay energized independently of said starting switch and to move said starting switch to open position, said starting switch remaining in said open position when so moved, further relay means energized upon the establishment of combustion and effective to deenergize said previously named relay and to maintain energization of said fuel controlling means independently of said relay, and means operative upon deenergization of said further relay means following the energization thereof to cause reclosure of said starting switch a timed period following such deenergization.

16. In fluid fuel burner control mechanism, a first relay adapted when energized to initiate energization of a fuel controlling means, a main switch and a starting switch controlling the energization of said first relay, said relay including means effective when said relay is energized to maintain said relay energized independently of said starting switch and to move said starting switch to open position, said starting switch remaining in said open position when so moved, a second relay, a combustion responsive device controlling the energization of said second relay and effective to cause energization of the same upon the establishment of combustion, said relay being effective when energized to deenergize said previously named relay and to maintain energization of said fuel controlling means independently of said relay, timing means effective when energized to cause said starting switch to reclose, and means operative upon deenergization of said second relay following the energization thereof to cause energization of said timing means.

SIEGFRIED G. ISSERSTEDT.